(12) United States Patent
Ong et al.

(10) Patent No.: US 9,623,444 B2
(45) Date of Patent: Apr. 18, 2017

(54) ROLLING SCREEN ASSEMBLY

(71) Applicant: FLSmidth A/S, Valby (DK)

(72) Inventors: Gordon Ong, Seventeen Mile Rocks (AU); Cristobal Brant, Newstead (AU)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 14/907,624

(22) PCT Filed: Jul. 29, 2013

(86) PCT No.: PCT/IB2013/056232
§ 371 (c)(1),
(2) Date: Jan. 26, 2016

(87) PCT Pub. No.: WO2015/015247
PCT Pub. Date: Feb. 5, 2015

(65) Prior Publication Data
US 2016/0158802 A1    Jun. 9, 2016

(51) Int. Cl.
| | | |
|---|---|---|
| *B07B 1/42* | (2006.01) | |
| *B07B 1/00* | (2006.01) | |
| *B07B 1/46* | (2006.01) | |
| *A01B 63/22* | (2006.01) | |
| *A01B 63/16* | (2006.01) | |

(52) U.S. Cl.
CPC ............... *B07B 1/005* (2013.01); *B07B 1/42* (2013.01); *B07B 1/46* (2013.01); *A01B 63/16* (2013.01); *A01B 63/22* (2013.01)

(58) Field of Classification Search
CPC  B07B 1/005; B07B 1/46; A01B 63/16; A01B 63/22

USPC ............ 209/420, 421; 280/43, 43.12, 43.14, 280/43.17, 23, 43.24
See application file for complete search history.

(56) References Cited

U.S. PATENT DOCUMENTS

| | | | | |
|---|---|---|---|---|
| 2,525,023 A | * | 10/1950 | Ensminger | B02C 13/00 16/34 |
| 3,439,806 A | * | 4/1969 | Kass | B07B 1/005 209/260 |
| 3,909,401 A | * | 9/1975 | Thompson | B07B 1/46 209/412 |
| 4,299,695 A | * | 11/1981 | Bostrom | B07B 1/005 209/260 |
| 4,640,364 A | * | 2/1987 | Theurer | E01B 27/105 104/7.1 |
| 4,694,948 A | * | 9/1987 | Ceylan | B65G 41/002 198/311 |
| 4,785,761 A | * | 11/1988 | Greenbank | B02B 1/02 118/682 |

(Continued)

FOREIGN PATENT DOCUMENTS

GB       2309923 A        8/1997

*Primary Examiner* — Joseph C Rodriguez
(74) *Attorney, Agent, or Firm* — Matthew R. Weaver; Daniel DeJoseph; Jeffrey A. Sharp (57) ABSTRACT

Disclosed herein is a rolling screen assembly. The rolling screen assembly may include a frame, a screen assembly mounted to the frame, a wheel assembly mounted to the frame, and a foot affixed to the frame, where wheels of the wheel assembly are height adjustable relative to the frame to allow the foot to be raised from, and lowered onto, a support surface. Such assembly may facilitate replacement of a rolling screen assembly with minimal downtime.

5 Claims, 7 Drawing Sheets

(56) References Cited

U.S. PATENT DOCUMENTS

| | | | | |
|---|---|---|---|---|
| 5,049,261 A * | 9/1991 | Tapp | ........................ | B03B 9/00 |
| | | | | 209/11 |
| 5,106,490 A * | 4/1992 | McDonald | .............. | B07B 1/005 |
| | | | | 209/240 |
| 5,234,564 A | 8/1993 | Smith | | |
| 5,362,193 A * | 11/1994 | Milstead | ................ | B65D 88/30 |
| | | | | 414/332 |
| 6,152,308 A * | 11/2000 | Kreiser | .................... | B07B 4/02 |
| | | | | 209/137 |
| 7,461,746 B1 * | 12/2008 | Egge | ....................... | B02C 21/02 |
| | | | | 209/268 |
| 7,513,370 B2 * | 4/2009 | Fridman | ................. | B07B 1/005 |
| | | | | 209/241 |
| 9,157,194 B2 * | 10/2015 | Theurer | ................ | E01B 27/105 |
| 2007/0194544 A1 * | 8/2007 | Price | ....................... | B62B 1/002 |
| | | | | 280/47.34 |
| 2011/0049263 A1 * | 3/2011 | Vander Zaag | ......... | A01B 63/22 |
| | | | | 239/172 |
| 2015/0321224 A1 * | 11/2015 | Schirm | .................... | B07B 1/28 |
| | | | | 414/800 |
| 2016/0256894 A1 * | 9/2016 | Reeser | .................. | B07B 1/4645 |

* cited by examiner

ROLLING SCREEN ASSEMBLY

FIELD OF THE INVENTION

The invention relates to a rolling screen assembly. In particular, although not exclusively, the invention relates to a rolling screen assembly that can be moved along rails and transferred to a support structure.

BACKGROUND TO THE INVENTION

Separations screens are typically used in the mining and mineral processing industries to separate materials, such as coal, by size. One type of separation screen is a vibrating screen that typically has a frame with screen panels. The frame is typically rigid with various support members to ensure structural integrity. The frame is mounted on springs, or the like, and has vibrators which cause the frame, and therefore the screen panels, to vibrate. The screen panels have apertures which allow smaller sized material to pass through. In use, the frame vibrates and material is passed over the screen panels with smaller material being separated from larger material as the smaller material passes through the apertures in the screen panels. Alternatively, liquids can be separated from solids in a similar manner.

Such separation screens require maintenance. This can be periodic maintenance to ensure smooth operation of the machine, such as replacement of worn screen panels, or unexpected maintenance due to component failure of the like. In some situations, particularly where the separation screen is part of a larger process, continuous operation is required and it is highly undesirable for a separation screen to go offline. A second separation screen may therefore be provided which is interchanged with the first separation screen to allow a separation screen to have downtime, e.g. for maintenance, without having to halt overall separation operations.

The separation screens are heavy and bulky, and swapping one separation screen for a second can be difficult. The separation screens may be mounted on wheels on a rail system. When an operating machine is to be substituted by a standby machine, the separation screens are wheeled along the rail until the standby machine takes the place of the previously operating machine. While this allows relatively straight forward interchanging of machines, the wheels and rails can be damaged by the continuous vibrations due to elevated forces being applied over a small area which can hinder, or even prevent, movement of the separation screen when it is to be interchanged.

It will be clearly understood that any reference herein to background material or information, or to a prior publication, does not constitute an admission that any material, information or publication forms part of the common general knowledge in the art, or is otherwise admissible prior art, whether in Australia or in any other country.

OBJECT OF THE INVENTION

It is an object of the invention to overcome or at least alleviate one or more of the above problems and/or provide the consumer with a useful or commercial choice. Other preferred objects of the present invention will become apparent from the following description.

DISCLOSURE OF THE INVENTION

In one form, although it need not be the only or indeed the broadest form, the invention resides in a rolling screen assembly comprising:

a frame;
a screen assembly mounted to the frame;
at least one wheel assembly mounted to the frame, the wheel assembly comprising one or more wheels; and
at least one foot affixed to the frame;
wherein, the wheels are height adjustable relative to the frame to allow the foot to be raised from and lowered onto a support surface.

Preferably the foot has a substantially planar base portion that is received by the support surface. Preferably the foot is a pedestal. The foot may include a biasing member, preferably a spring. Preferably the support surface is an upper surface of a support structure located on the ground. Preferably a plurality of feet are provided. In a preferred form, four feet are provided in a substantially rectangular configuration.

Preferably a plurality of wheel assemblies is provided. Preferably at least a portion of the wheel assemblies comprises a stopper. Preferably a stopper is provided adjacent at least two of the wheels. Preferably each wheel assembly comprises a wheel adjustment mechanism that moves a wheel relative to the frame. Preferably the wheel adjustment mechanism moves the wheel in at least a vertical axis relative to the frame. Preferably the wheel adjustment mechanism comprises a wheel bracket movably mounted to the frame, even more preferably pivotally mounted to the frame.

Preferably the wheel adjustment mechanism comprises an actuator to move the wheel relative to the frame. Preferably the actuator moves the wheel between at least an in use position and a stowed position. Preferably the in use position is further from the frame in the vertical axis than the stowed position. Preferably the wheel bracket actuator causes the wheel bracket to rotate about a pivot between the wheel bracket and the frame. Preferably the actuator is an extendible member, more preferably a cylinder, even more preferably a hydraulically actuated cylinder. Preferably a plurality of wheels is configured to pivot substantially simultaneously.

Preferably the screen assembly is a vibrating screen assembly, and preferably further comprises one or more exciters that generate vibratory forces. Preferably the exciters are mounted to side walls of the screen assembly. Even more preferably, the exciters are mounted to a drive beam that is mounted to the side walls. Preferably the screen assembly comprises a plurality of screen panels and a screen panel mounting system.

Preferably the wheels are adapted to operate on rails. Preferably the wheels are disengaged from the rails when in the stowed position. Preferably the rolling screen assembly is supported by the wheels when they are in the in use position, and supported by the at least one foot when the wheels are in the stowed position.

Preferably the at least one foot comprises a locking assembly. Preferably the locking assembly comprises a locking member. Preferably the locking member is configured to move between a locked position and an unlocked position. Preferably the locking member is rotated axially between the locked and the unlocked positions. Preferably the locking member is actuated by an actuator. Preferably the actuator is controlled remotely.

The locking assembly may also comprise a guide plate. Preferably the guide plate has inclined surfaces. Preferably the locking member is received by a locking opening in the support surface and/or the guide plate is received by a guide opening in the support surface. Preferably actuation of the locking member prevents withdrawal of the locking member from the locking opening of the support surface.

According to another form, the invention resides in a rolling screen system comprising:

two rolling screen assemblies as described herein;

a set of rails upon which the rolling screen assemblies traverse;

and a support surface adjacent an operating position on the rails;

wherein a first rolling screen assembly is configured to manoeuvre from an operating position wherein the foot of the first rolling screen assembly engages with the support surface to a first storage position offset along the rails from the operating position; and wherein a second rolling screen assembly is configured to manoeuvre from a second storage position offset along the rails from the operating position and the first storage position to the operating position wherein the foot of the second rolling screen assembly engages with the support surface.

Preferably when the first or second rolling screen assemblies are in the operating position, the foot of the first or second rolling screen assembly is lowered to engage with the support surface. Preferably the foot of the first and second rolling screen assemblies is lowered by pivoting the wheels relative to the frame. According to yet another form of the invention, there is provided a method of manoeuvring a rolling screen assembly, the method comprising the steps of:

raising a foot of the rolling screen assembly off a support surface; and manoeuvring the rolling screen assembly from an operating position along a set of rails to a storage position that is different to the operating position.

Preferably the step of raising a foot of a rolling screen assembly off a support surface comprises lowering wheels of the rolling screen assembly onto the set of rails. Preferably the foot of the rolling screen assembly is raised by lowering the wheels onto the rail.

According to yet another form of the invention, there is provided a method of replacing a first rolling screen assembly with a second rolling screen assembly, the method comprising the steps of:

raising a foot of the first rolling screen assembly in an operating position off a support surface;

manoeuvring the first rolling screen assembly along a set of rails to a first storage position that is different to the operating position;

manoeuvring the second rolling screen assembly along the set of rails from a second storage position, that is different to the operating position and the first storage position, to the operating position; and lowering a foot of the second rolling screen assembly onto the support surface.

The methods preferably further comprise the steps of unlocking the foot of a rolling screen assembly from the support surface and/or locking the foot of a rolling screen assembly to the support surface. Preferably the support surface is a surface, preferably a substantially planar upper surface, of a support structure.

Preferably the rolling screen assembly is as described herein. Preferably the methods are automated and require little or no human intervention.

Further features of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, wherein.

DETAILED DESCRIPTION OF THE INVENTION

Figure 1:
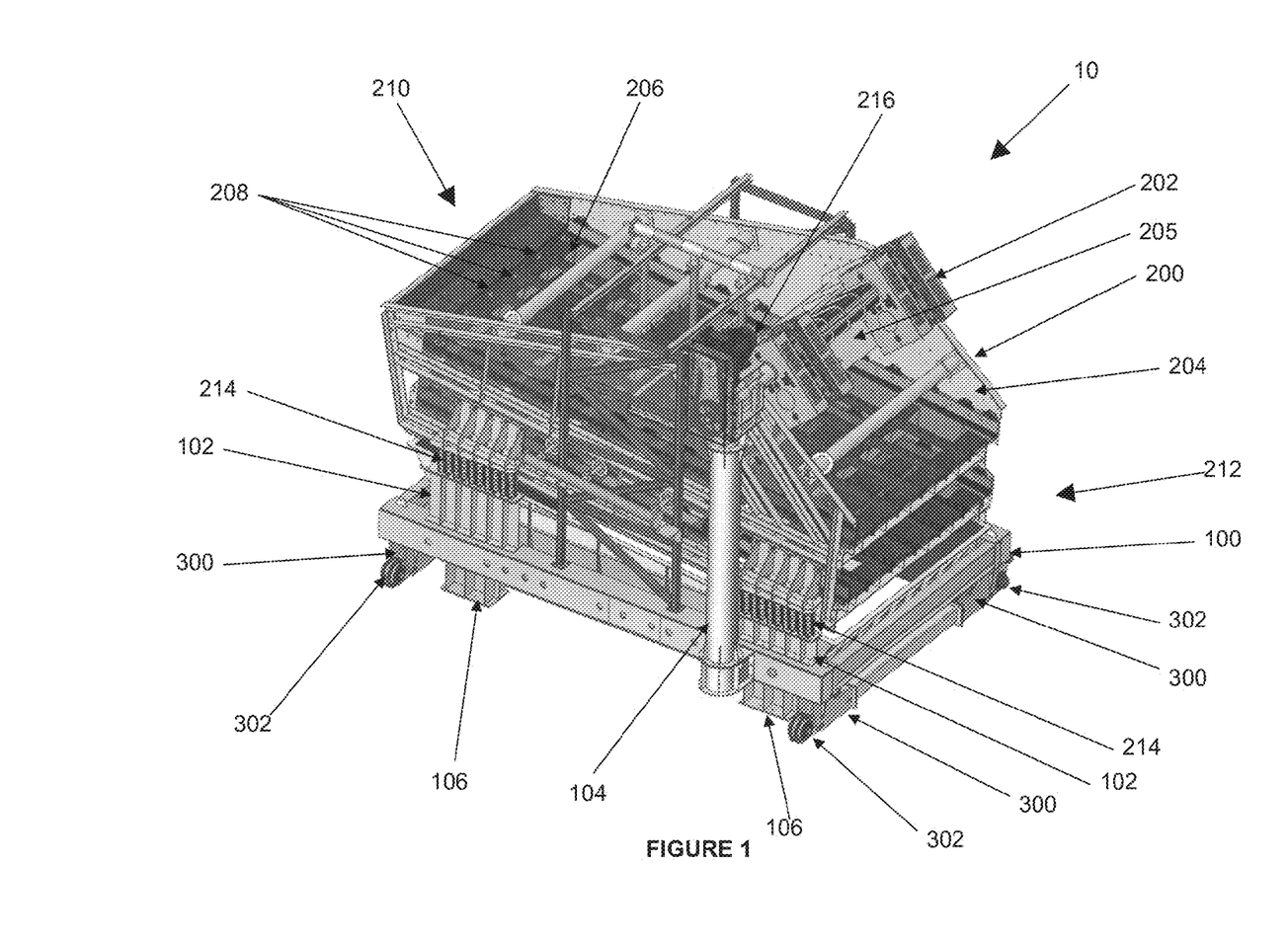
FIG. 1 is a partially transparent perspective view of a rolling screen assembly according to an embodiment of the invention.

FIG. 1 illustrates a perspective view of a rolling screen assembly 10 with some portions being transparent for clarity. The rolling screen assembly 10 has a frame 100, which can be seen in more detail in FIG. 2, with a screen assembly 200 mounted thereon. Wheel assemblies 300 are mounted to the frame 100, with each wheel assembly 300 having an associated wheel 302. The frame 100 is generally rectangular and there is a wheel assembly 300 and associated wheel 302 located in each of the four corners of the frame 100.

The screen assembly 200 has a pair of exciters 202, which generate vibratory forces, mounted to opposed side walls 204 via a drive beam 205. Between the side walls 204 are screen panels 206 which have an arrangement of apertures (not shown) that allows smaller particles of material to pass through the screen panel 206. Typically a plurality of releasably mounted screen panels 206 are provided which can be removed and replaced from stringers 208 underneath the panels using a suitable mounting assembly (not shown).

The screen assembly 200 has an inlet end 210 that receives material to be separated and an outlet end 212 to outputs separated material. The screen assembly 200 is mounted on top of the frame 100 via springs 214 which enable the screen assembly 200 to vibrate substantially independently of the frame 100. The springs 214 are mounted on spring mounts 102 of the frame 100. A drive system 216 is mounted on a column 104 of the frame 100 and is mechanically coupled to exciters 202.

Figure 2:
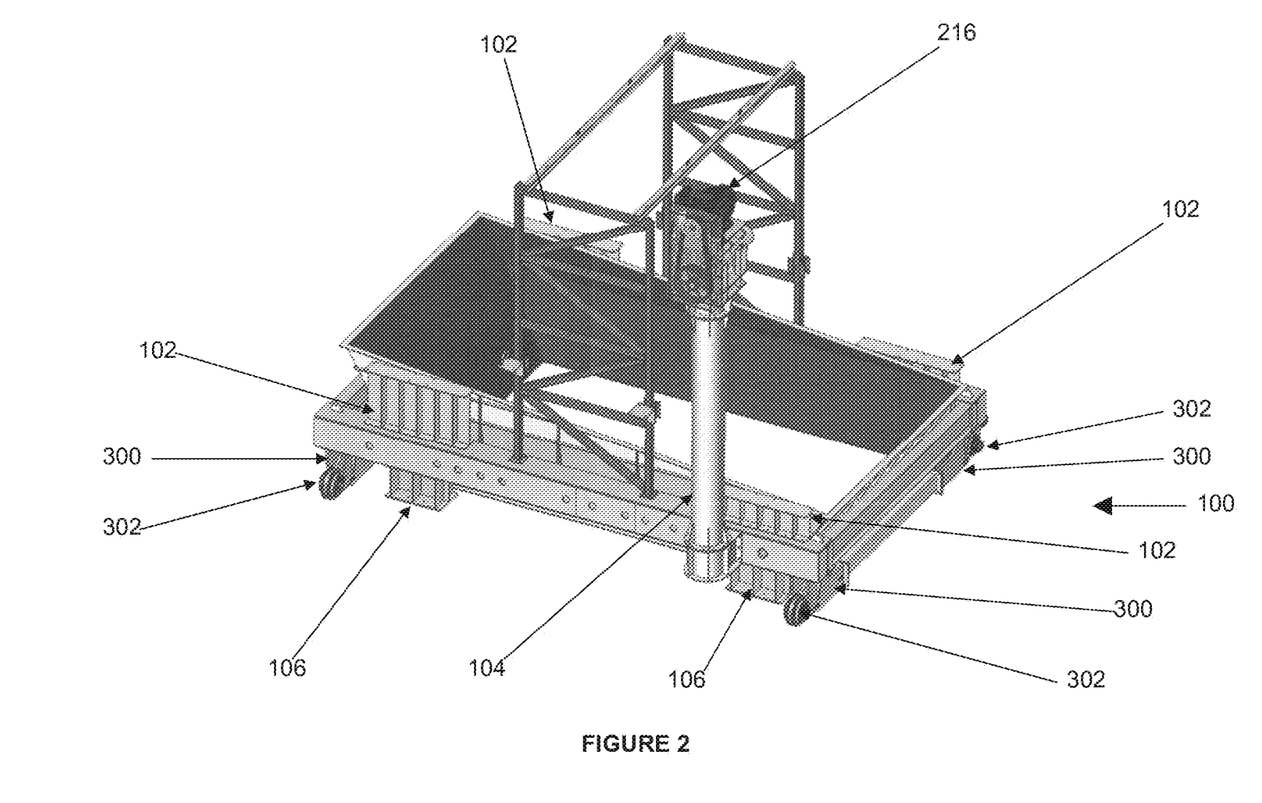
FIG. 2 is a cutaway perspective view of the rolling screen assembly illustrated in FIG. 1 with various components removed from view.

The frame 100, which is seen most clearly in FIG. 2, has four feet in the form of pedestals 106 which are each located adjacent a wheel assembly 300. The wheel assemblies 300 are movable such that the wheels 302 pivot about a pivot portion of the frame 100, effectively raising and lowering the wheels 302 relative to the frame 100. The wheels 302 mechanically engaged with actuators in the form of hydraulic cylinders 304 (not visible in FIG. 1 or 2, see FIG. 4) that extend and retract linearly, moving a portion of the wheel assembly 300 about the pivot axis of the pivot portion of the frame 100.

Figure 3:
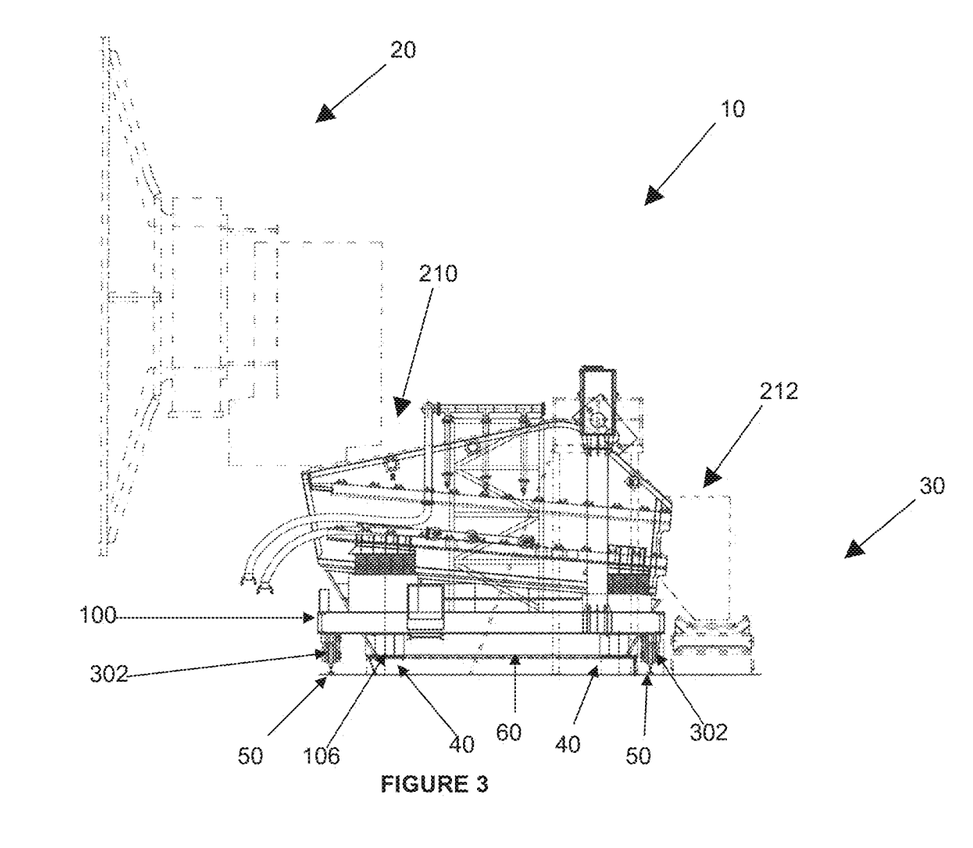
FIG. 3 is a side elevation view of a rolling screen system as part of a material processing process.

FIG. 3 illustrates a rolling screen system as part of a process having an operating rolling screen assembly 10 located between a material discharge chute 20 from, for example, a mill such as a Semi-Autogenous Grinding (SAG) mill, and a conveyor 30. The pedestals 106 of the rolling screen assembly 10 are supporting the rolling screen assembly 10 on a support structure in the form of plinths 40 located beneath the pedestals 106.

Wheels 302 are located adjacent rails 50 beneath the rolling screen assembly 10. As illustrated in FIG. 3, the wheels 302 are in a stowed position in which they are disengaged from the rails 50. Located below rolling screen assembly 10 between the rails 50 is a screen underpan 60.

Figure 4:
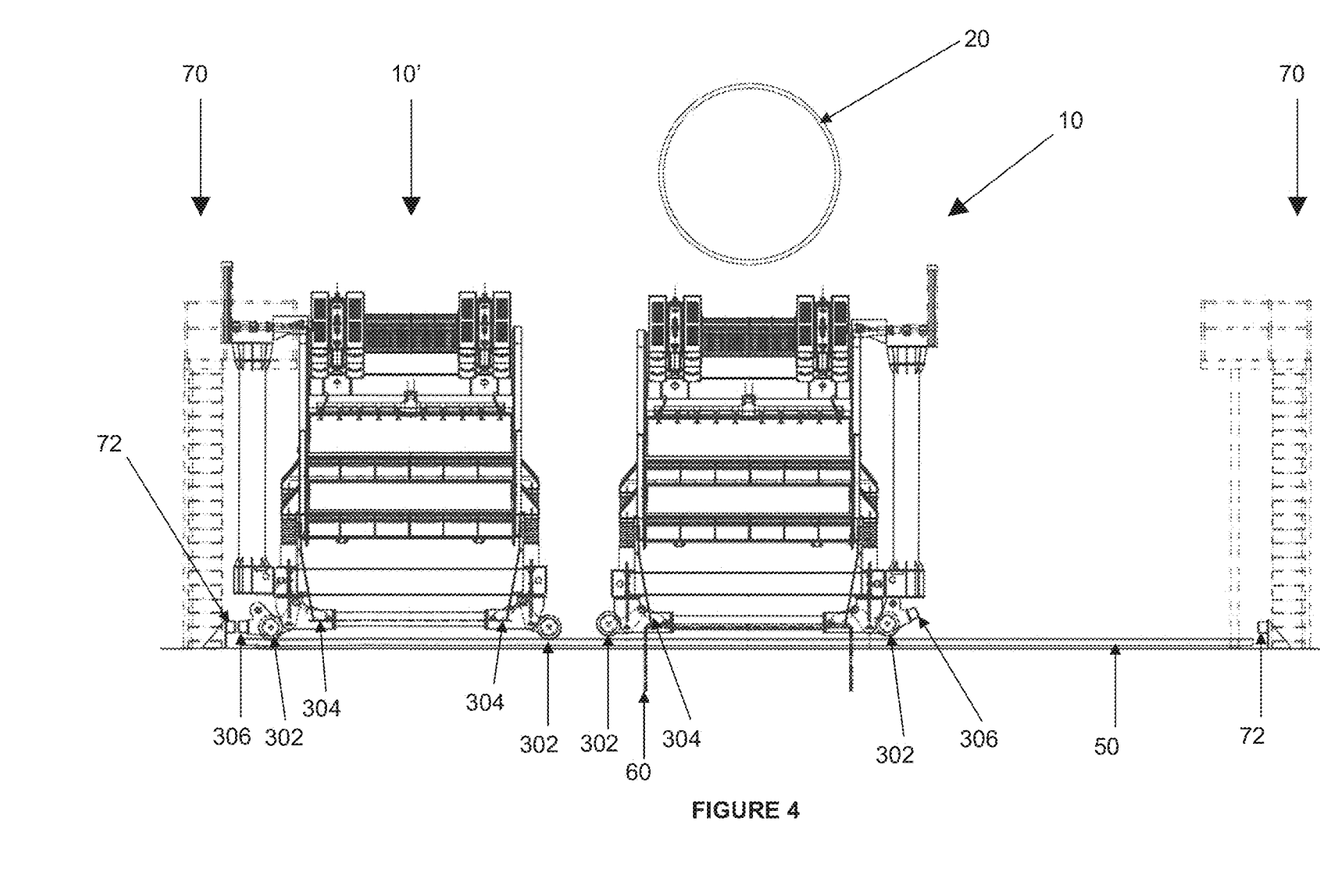
FIG. 4 is a front elevation view of the rolling screen system illustrated in FIG. 3, having two rolling screen assemblies.

Turning to FIG. 4, which is a front elevation view of FIG. 3, it can be seen that adjacent operating rolling screen assembly 10 is a standby rolling screen assembly 10'. The two rolling screen assemblies 10 and 10' are largely the same, but with slightly different configurations to allow servicing from maintenance platforms 70 on different sides.

The wheel assemblies 300 on the side of the rolling screen assembly 10 that is adjacent the maintenance platforms 70 has a stopper 306 configured to engage with a corresponding stopper 72 on the maintenance platforms 70 when the wheels 302 are engaged with the rails 50. When the wheels 302 of a rolling screen assembly 10 or 10' are disengaged, as shown for operating screen assembly 10 in FIG. 4, the stopper 306 is inclined relative to the rail 50. When the wheels 302 are engaged with the rail, however, the stopper 306 is substantially parallel to the rails 50.

Operating rolling screen assembly 10 is in an operating position below the mill outlet 20 and standby rolling screen assembly 10' is located next to the operating rolling screen assembly 10. Both screen assemblies 10 and 10' are located on the same rails 50. Operating screen assembly 10 is supported by pedestals 106 on plinths 40 with the wheels 302 being disengaged from the rail 50. Standby screen assembly 10' is, however, supported by wheels 302 on the rails 50. Alternatively, standby screen assembly 10' could be supported by a second set of plinths (not shown) located adjacent the standby position.

Figure 7:
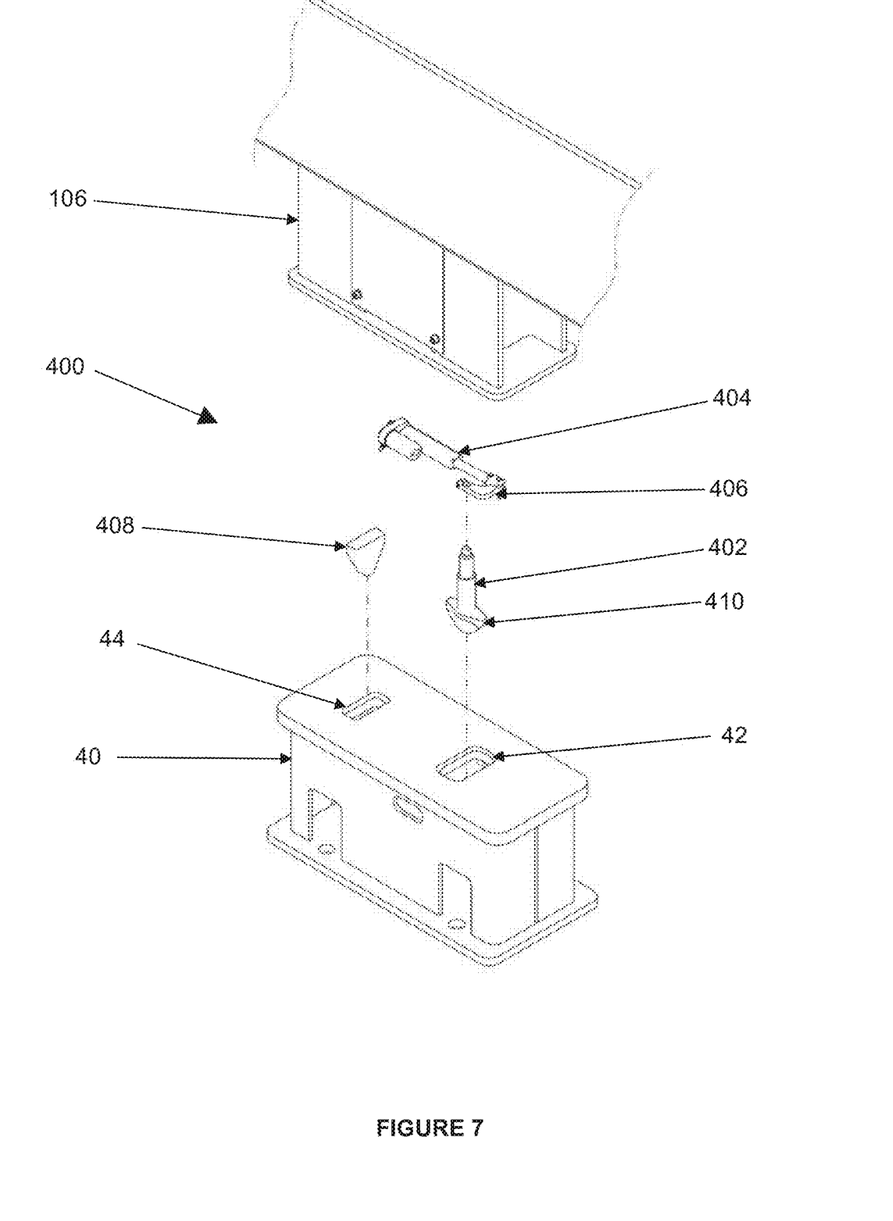
FIG. 7 is an exploded perspective view of a locking assembly according to an embodiment of the invention.
Figure 8:
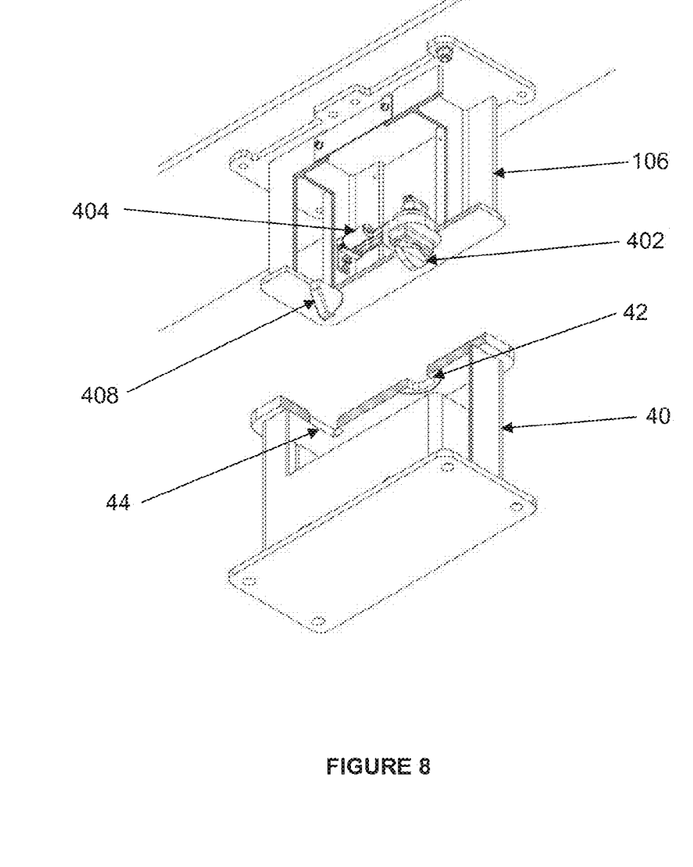
FIG. 8 is a cutaway perspective view of the locking assembly illustrated in FIG. 7 in an unlocked position.
Figure 9:
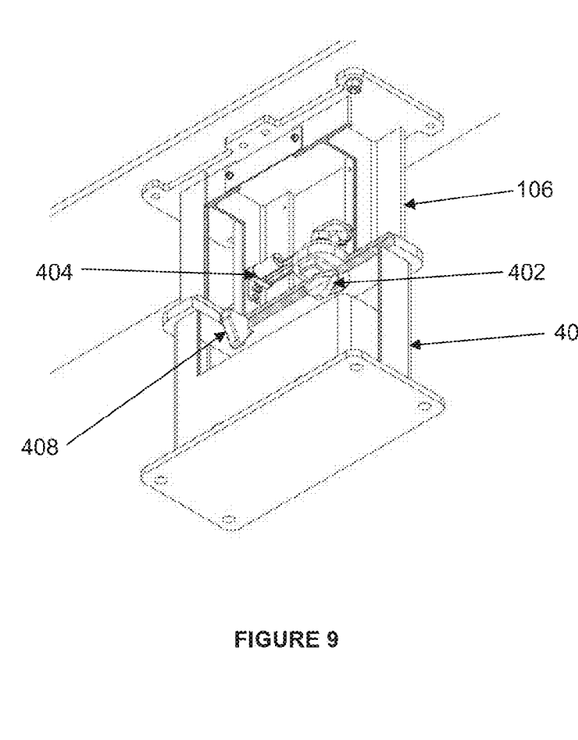
FIG. 9 is a cutaway perspective view of the locking assembly illustrated in FIG. 7 in a locked position.

FIGS. 7 to 9 illustrate a locking assembly 400 configured to lock the pedestals 106 of the frame 100 to the plinths 40. The locking assembly 400 comprises a locking member 402 connected to an actuator 404. As the actuator 404 is actuated, the locking member 402 is rotated between an unlocked position (as illustrated in FIG. 8) and a locked position (as illustrated in FIG. 9).

In the illustrated embodiment the actuator 404 is a linear actuator, such as a hydraulic or pneumatic cylinder, connected to a lever 406 which translates the linear movement of the actuator into a rotational movement of the locking member 402. It will be appreciated that other forms of actuators and/or translation mechanisms can be utilised to actuate the locking member 402 between locked and unlocked positions.

As seen most clearly in FIG. 7, the plinths 40 have two openings, a locking opening 42 and a guide opening 44. The locking opening 42 is arranged to receive a portion of the locking member 402 and the guide opening 44 is arranged to receive at least a portion of a guide member 408 of the locking assembly 400. The locking opening 42 is shaped to allow passage of the locking member 402 when in the unlocked position, but to prevent passage of the locking member 402 when in the locked position.

In the illustrated embodiment, the locking member 402 has an enlarged portion 410 (see FIG. 7) that is elongate, having a longitudinal axis that is perpendicular to the axial axis of the locking member 402. The locking opening 42 is correspondingly elongate to allow passage of the enlarged portion 410 of the locking member 402 when the enlarged portion 410 is aligned longitudinally with the locking opening 42 (as illustrated in FIG. 8) and to prevent passage of the enlarged portion 410 of the locking member 402 when the enlarged portion 410 is not aligned longitudinally with the locking opening 42 (as illustrated in FIG. 9). Both the locking member 402 and guide member 408 have inclined surfaces that can provide an alignment effect as they are inserted into their respective openings 42 and 44. In the illustrated embodiment the guide member 408 and the enlarged portion 410 of the locking member 402 are generally triangular in shape, with an apex being centrally located between the inclined surfaces.

In use, material to be processed by the rolling screen assembly 10 is received at the inlet end 210 of the rolling screen assembly 10 from the material discharge chute 20. The material is separated using the rolling screen assembly 10 and material which does not pass through the screen panels is expelled from the outlet end 212 of the rolling screen assembly 10.

Figure 5:
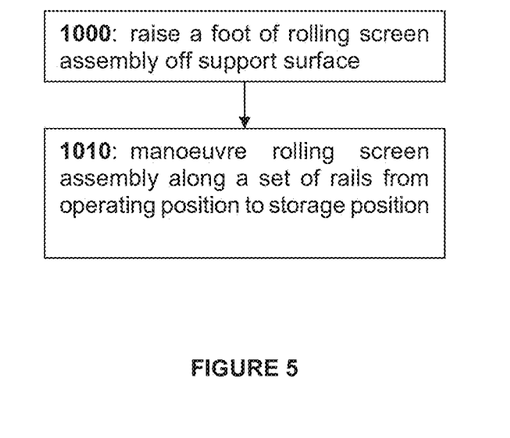
FIG. 5 is a flow chart illustrating steps according to a method of manoeuvring a rolling screen assembly.

When maintenance or servicing is required to be carried out on the rolling screen assembly 10, it may be manoeuvred to a maintenance platform 70 as outlined in the flowchart of FIG. 5. Namely, the foot 106 of the rolling screen assembly 10 is raised off a support surface 40 (step 1000) by pivoting at least a portion of the wheel assembly 300 relative to the frame 10 such that the wheels 302 engage with the rail 50, and the rolling screen assembly 10 is then manoeuvred along the rails 50 from the operating position below material discharge chute 20 to the storage position adjacent maintenance platform 70 (step 1010).

Figure 6:
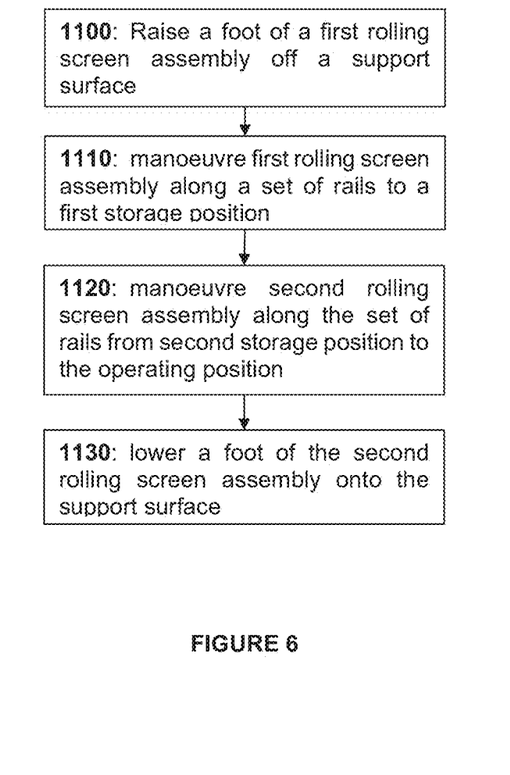
FIG. 6 is a flow chart illustrating steps according to a method of replacing a rolling screen assembly with another rolling screen assembly.

Moving the rolling screen assembly 10 from an operating position to a storage position for maintenance, or the like, takes the rolling screen assembly 10 out of service. Accordingly, in order to ensure continuous processing it is preferred to have a standby rolling screen assembly 10', as illustrated in FIG. 4, to take its place. To replace a first rolling screen assembly, such as an operating rolling screen assembly 10, with a second rolling screen assembly, such as a standby rolling screen assembly 10', the foot 106 of the first rolling screen assembly 10 is raised off a support surface 40 (step 1100) by pivoting at least a portion of the wheel assembly 300 relative to the frame 10 such that the wheels 302 engage with the rail 50 and lift the foot 106 from the support surface 40. The rolling screen assembly 10 is then manoeuvred along the rails 50 from the operating position below material discharge chute 20 to a first storage position, typically adjacent a maintenance platform 70 (step 1110) and the second rolling screen assembly 10' is similarly manoeuvred along the rails, typically in the same direction along a substantially linear rail, from a second storage position adjacent a maintenance platform 70 to the operating position (step 1120). The foot 106 of the second rolling screen assembly is then lowered onto the support surface 40 (step 1130) by pivoting at least a portion of the wheel assembly 300 relative to the frame 10 such that the wheels 302 disengage with the rail 50.

In use the locking mechanism 400 allows the foot 106 to be locked to the plinth 40 by locating the locking member 410 in through the locking opening 42, and the guide member 408 through the guide opening 44 and actuating the actuator 404 to rotate the locking member 410 into the locked position. Unlocking the foot 106 from the plinth 40 is in reverse, with the actuator 404 being actuated to rotate the locking member 410 into the unlocked position and removing the locking member 410 from the locking opening 42.

The present invention allows a rolling screen assembly 10 to be supported rigidly by a support surface, preferably a support structure such as a plinth 40, in use, and for the wheels 302 to be engaged to manoeuvre the rolling screen assembly 10 from the support surface, and replaced with a second rolling screen assembly, when needed. The second rolling screen assembly can then be lowered onto the plinth 40 and operations can continue while the first rolling screen assembly is out of service. Preferably the movement operations are automated such that each rolling screen assembly 10 and 10' autonomously, or at least semi-autonomously, carry out the steps of the invention. The locking mechanism 400 can also be operated remotely, preferably autonomously before and after manoeuvring.

Advantageously, the invention allows ready and rapid replacement of a rolling screen assembly 10 to ensure material processing operations have minimal downtime when a rolling screen assembly 10 needs maintenance or servicing, or the like. Furthermore, the wheels 302 and rails 50 are not damaged by the vibratory forces, improving reliability and safety, and reducing maintenance costs. The locking mechanism 400 advantageously secures the rolling screen assembly 10 to improve stability, which is particularly important in areas where movement may occur such as, for example, due to seismic loads. The locking mechanism 400 can be actuated remotely, preventing the need for any personnel to get underneath the rolling screen assembly 10 to manually secure the rolling screen assembly 10, thus further improving safety and efficiency.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In the present specification and claims (if any), the word "comprising" and its derivatives including "comprises" and "comprise" include each of the stated integers but does not exclude the inclusion of one or more further integers unless the context of use indicates otherwise.

The invention claimed is:

1. A rolling screen system comprising:
   two rolling screen assemblies, the two rolling screen assemblies each comprising a frame; a screen assembly mounted to the frame; at least one wheel assembly mounted to the frame, the wheel assembly comprising one or more wheels and a wheel adjustment mechanism; and at least one foot affixed to the frame; wherein, the wheels are height adjustable relative to the frame to allow the foot to be raised from and lowered onto a support surface;
   a set of rails upon which the rolling screen assemblies traverse; and
   a support surface adjacent an operating position;
   wherein a first rolling screen assembly is configured to maneuver from the operating position, wherein the foot of the first rolling screen assembly engages with the support surface, to a first storage position offset along the rails from the operating position; and
   wherein a second rolling screen assembly is configured to maneuver from a second storage position, offset along the rails from the operating position and the first storage position, to the operating position, wherein the foot of the second rolling screen assembly engages with the support surface.

2. The rolling screen assembly of claim 1, wherein the wheel adjustment mechanism comprises a wheel bracket pivotally mounted to the frame.

3. The rolling screen assembly of claim 1, wherein the wheel adjustment mechanism comprises an actuator to move the wheel relative to the frame between at least an in use position and a stowed position.

4. The rolling screen assembly of claim 1, wherein the frame is generally rectangular and wherein the wheel assembly and associated wheels are located in each of the four corners of the frame.

5. The rolling screen assembly of claim 1, wherein the wheel assembly comprises a stopper.

* * * * *